United States Patent
Ando

(10) Patent No.: US 12,187,225 B2
(45) Date of Patent: Jan. 7, 2025

(54) VEHICLE

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 217 days.

(21) Appl. No.: 18/074,183

(22) Filed: Dec. 2, 2022

(65) Prior Publication Data
US 2023/0182681 A1 Jun. 15, 2023

(30) Foreign Application Priority Data
Dec. 14, 2021 (JP) ................................ 2021-202549

(51) Int. Cl.
| | |
|---|---|
| *B60R 25/04* | (2013.01) |
| *B60R 25/08* | (2006.01) |
| *B60T 7/12* | (2006.01) |
| *B60T 8/94* | (2006.01) |
| *B60T 13/74* | (2006.01) |
| *B60T 17/22* | (2006.01) |
| *F16D 66/00* | (2006.01) |

(52) U.S. Cl.
CPC .............. *B60R 25/08* (2013.01); *B60R 25/04* (2013.01); *B60T 7/12* (2013.01); *B60T 8/94* (2013.01); *B60T 13/745* (2013.01); *B60T 17/22* (2013.01); *B60T 2201/00* (2013.01); *B60T 2220/00* (2013.01); *B60T 2270/402* (2013.01); *B60T 2270/414* (2013.01); *F16D 2066/001* (2013.01)

(58) Field of Classification Search
CPC . B60R 25/04; B60R 25/08; B60T 7/12; B60T 8/94; B60T 13/745; B60T 17/22; B60T 2201/00; B60T 2220/00; B60T 2270/40; F16D 2066/001
USPC ...................................................... 701/70–98
See application file for complete search history.

(56) References Cited

U.S. PATENT DOCUMENTS

| | | | | |
|---|---|---|---|---|
| 4,951,776 A | * | 8/1990 | Jeter ...................... | B60R 25/08 188/353 |
| 5,912,615 A | * | 6/1999 | Kretzmar .............. | B60R 25/104 340/428 |
| 9,002,575 B2 | * | 4/2015 | Harvey ................... | B60R 25/04 340/426.22 |

(Continued)

FOREIGN PATENT DOCUMENTS

JP 2006-44398 A 2/2006

*Primary Examiner* — Erick R Solis
(74) *Attorney, Agent, or Firm* — TROUTMAN PEPPER HAMILTON SANDERS LLP

(57) ABSTRACT

A vehicle includes: a brake mechanism configured to brake a wheel in accordance with a pressure of a brake fluid; a hydraulic circuit configured to adjust the pressure of the brake fluid and transfer the brake fluid to the brake mechanism; and a controller. The controller includes one or more processors to execute: a torque adjustment process of giving an offset to increase a required driving torque determined based on an operation amount of accelerator of the vehicle in a case where it is determined that the vehicle is in a stolen state; and a brake fluid pressure adjustment process of applying control to the hydraulic circuit to pressurize the brake fluid so as to compensate for an increase in the required driving torque due to the offset.

16 Claims, 7 Drawing Sheets

(56) References Cited

U.S. PATENT DOCUMENTS

| | | | |
|---|---|---|---|
| 2001/0056544 A1* | 12/2001 | Walker | B60R 25/102 |
| | | | 180/170 |
| 2006/0028060 A1 | 2/2006 | Kuramochi et al. | |
| 2010/0262348 A1* | 10/2010 | Nallapa | B60W 50/085 |
| | | | 701/84 |
| 2020/0122683 A1* | 4/2020 | Huang | B60R 25/20 |
| 2021/0155201 A1* | 5/2021 | Kern | B60R 25/003 |
| 2023/0286462 A1* | 9/2023 | Oh | B60Q 9/00 |
| 2024/0144746 A1* | 5/2024 | Zizzadoro | B60R 25/24 |

\* cited by examiner

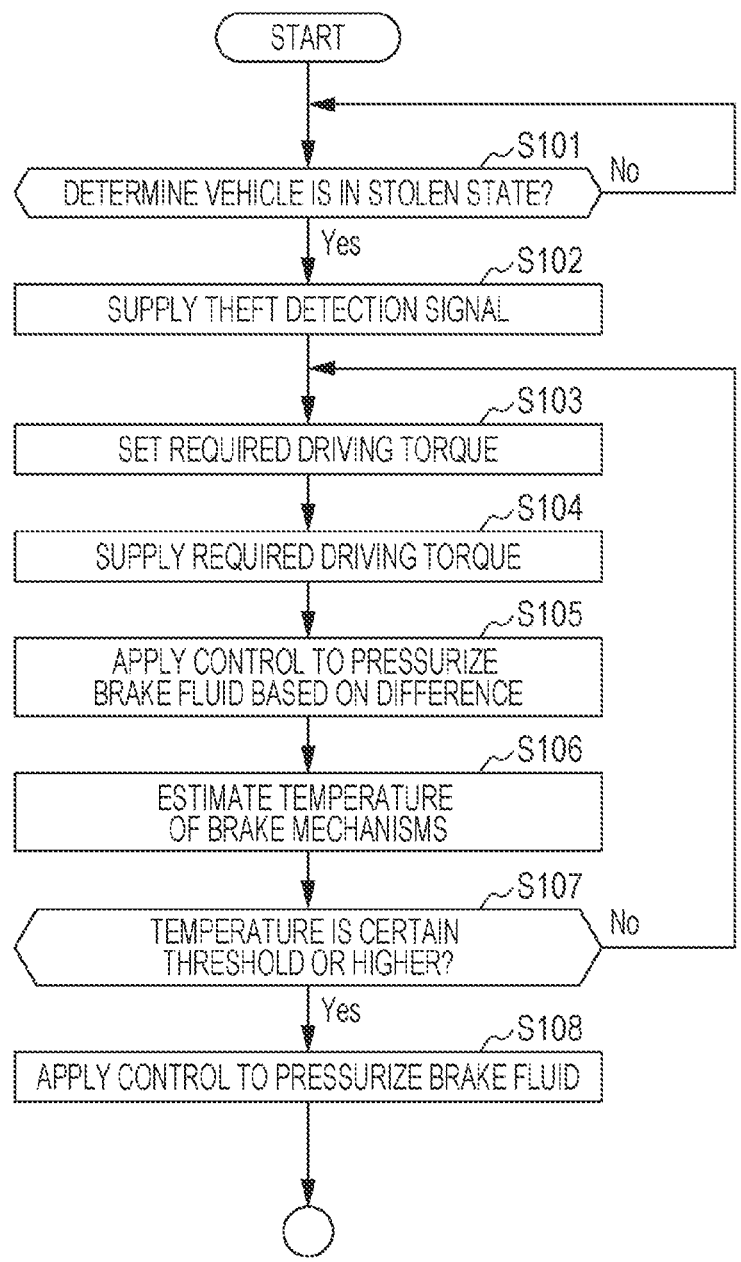

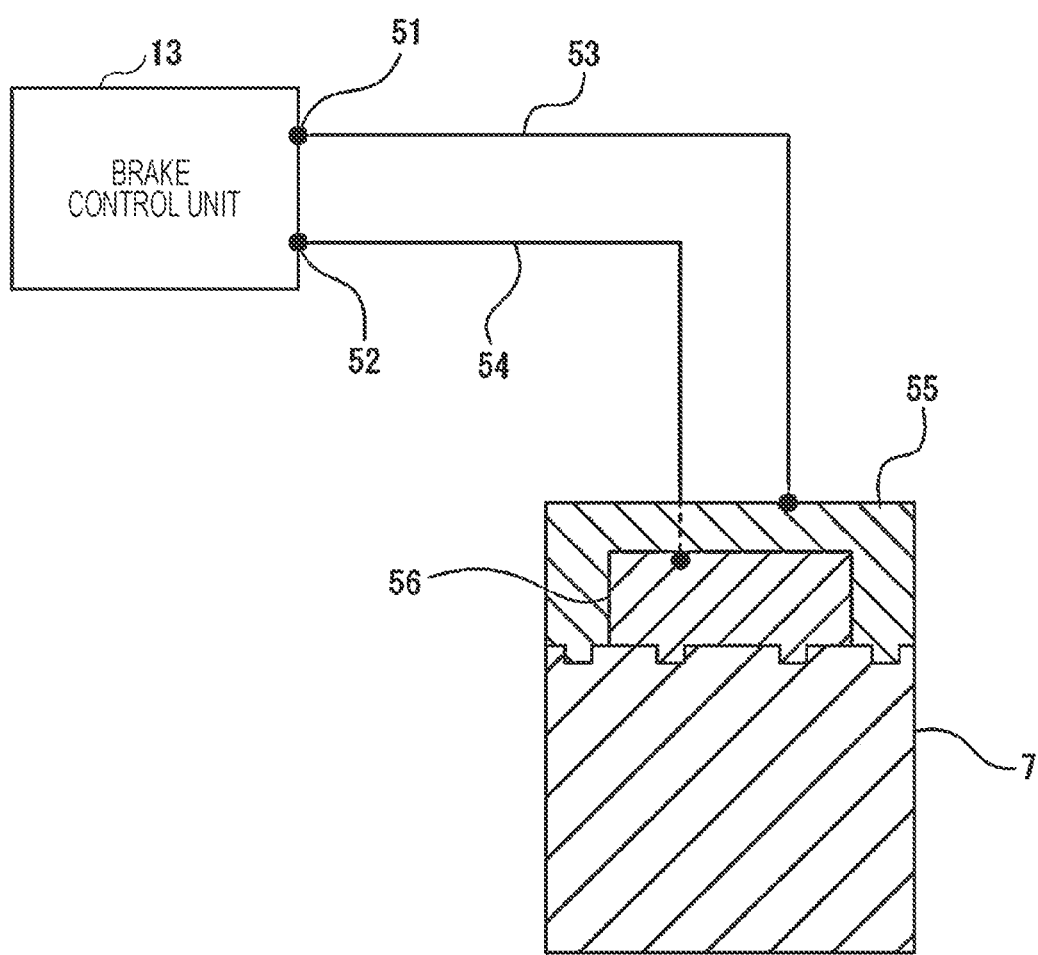

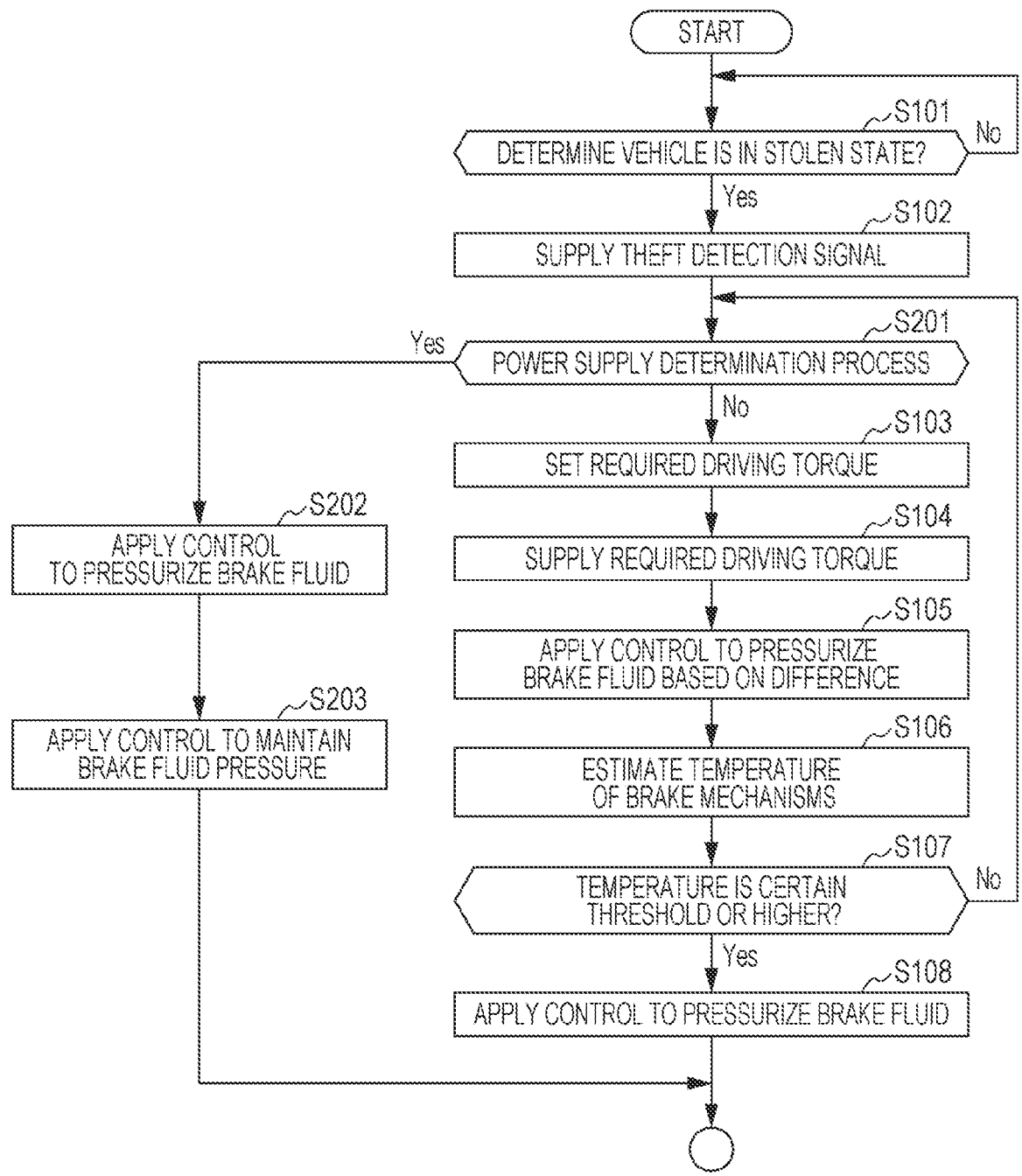

VEHICLE

CROSS-REFERENCE TO RELATED APPLICATION

The present application claims priority from Japanese Patent Application No. 2021-202549 filed on Dec. 14, 2021, the entire contents of which are hereby incorporated by reference.

BACKGROUND

The disclosure relates to a vehicle configured to apply control to prevent theft.

Vehicles configured to apply control to prevent theft are known. For example, Japanese Unexamined Patent Application Publication (JP-A) No. 2006-44398 discloses a vehicle including a brake control unit configured to determine whether the vehicle is in a stolen state based on a detection signal such as the vibrations or tilt of the vehicle or opening of a door in a locked state, and, if it is determined that the vehicle is in a stolen state, to apply control to mechanically lock the wheels of the vehicle using brake mechanisms.

SUMMARY

An aspect of the disclosure provides a vehicle including: a brake mechanism configured to brake a wheel in accordance with a pressure of a brake fluid; a hydraulic circuit configured to adjust the pressure of the brake fluid and transfer the brake fluid to the brake mechanism; and a controller. The controller includes one or more processors, and a storage medium in which one or more programs executed by the one or more processors are stored. The one or more programs include one or more instructions. The one or more instructions cause the one or more processors to execute: a torque adjustment process of giving an offset to increase a required driving torque determined based on an operation amount of accelerator of the vehicle in a case where it is determined that the vehicle is in a stolen state; and a brake fluid pressure adjustment process of applying control to the hydraulic circuit to pressurize the brake fluid so as to compensate for an increase in the required driving torque due to the offset.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

FIG. 5 is a flowchart illustrating an example of a process executed by a controller according to an embodiment;

FIG. 6 is an explanatory diagram schematically illustrating the state of coupling of a brake control unit and a battery; and FIG. 7 is a flowchart illustrating an example of a process executed by the controller according to an embodiment.

DETAILED DESCRIPTION

Figure 1:
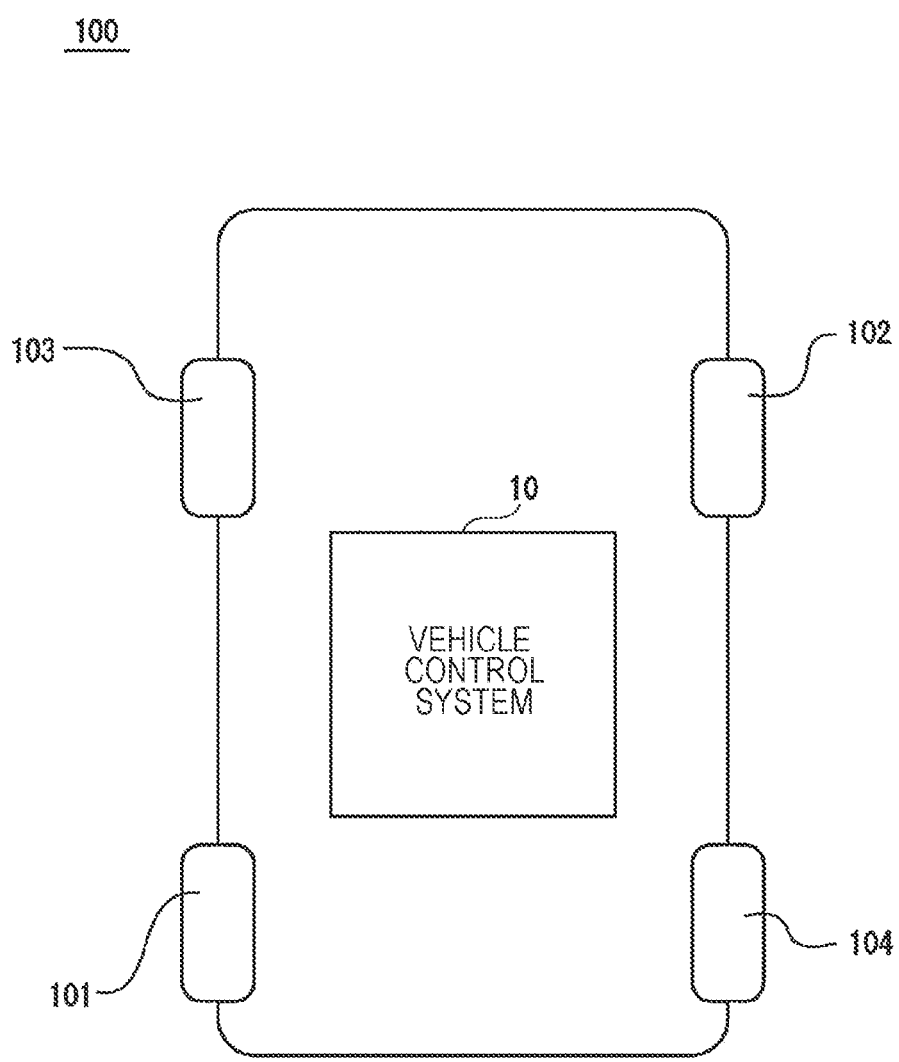
FIG. 1 is an explanatory diagram illustrating an example of the configuration of a vehicle according to an embodiment.

If the wheels of a vehicle are locked immediately after it is determined that the vehicle is in a stolen state as described in JP-A 2006-44398 mentioned above, the thief who stole the vehicle may easily realize that theft deterrent control has been activated, and there is a risk that the wheels that are locked by brake mechanisms will be unlocked by draining the brake fluid or cutting off the power supply to a brake control unit.

It is desirable to effectively prevent vehicle theft by executing theft deterrent control without being realized by a thief.

An embodiment will now be described hereinafter with reference to FIGS. 1 to 7. Note that configurations illustrated in the drawings referenced in the description of the present embodiment schematically illustrate the configurations of extracted portions that are necessary for realizing the present embodiment and their surroundings. Therefore, the relationships, ratios, etc. of the thickness and the planar dimensions of each structure illustrated in the drawings are only one example, and various changes can be made in accordance with designs and the like as long as the changes do not depart from the scope of the technical idea of the disclosure. Further, elements in the following example embodiment which are not recited in a most-generic independent claim of the disclosure are optional and may be provided on an as-needed basis. Throughout the present specification and the drawings, elements having substantially the same function and configuration are denoted with the same numerals to avoid any redundant description.

As illustrated in FIG. 1, a vehicle 100 according to the embodiment includes a vehicle control system 10. In the present embodiment, the vehicle 100 is described as, for example, an engine vehicle equipped with an engine alone as the driving source of the wheels. Note that the vehicle 100 may be, for example, a hybrid vehicle equipped with both an engine and a motor as the driving sources of the wheels, or may be an electric vehicle equipped with a motor alone as the driving source of the wheels.

Figure 2:
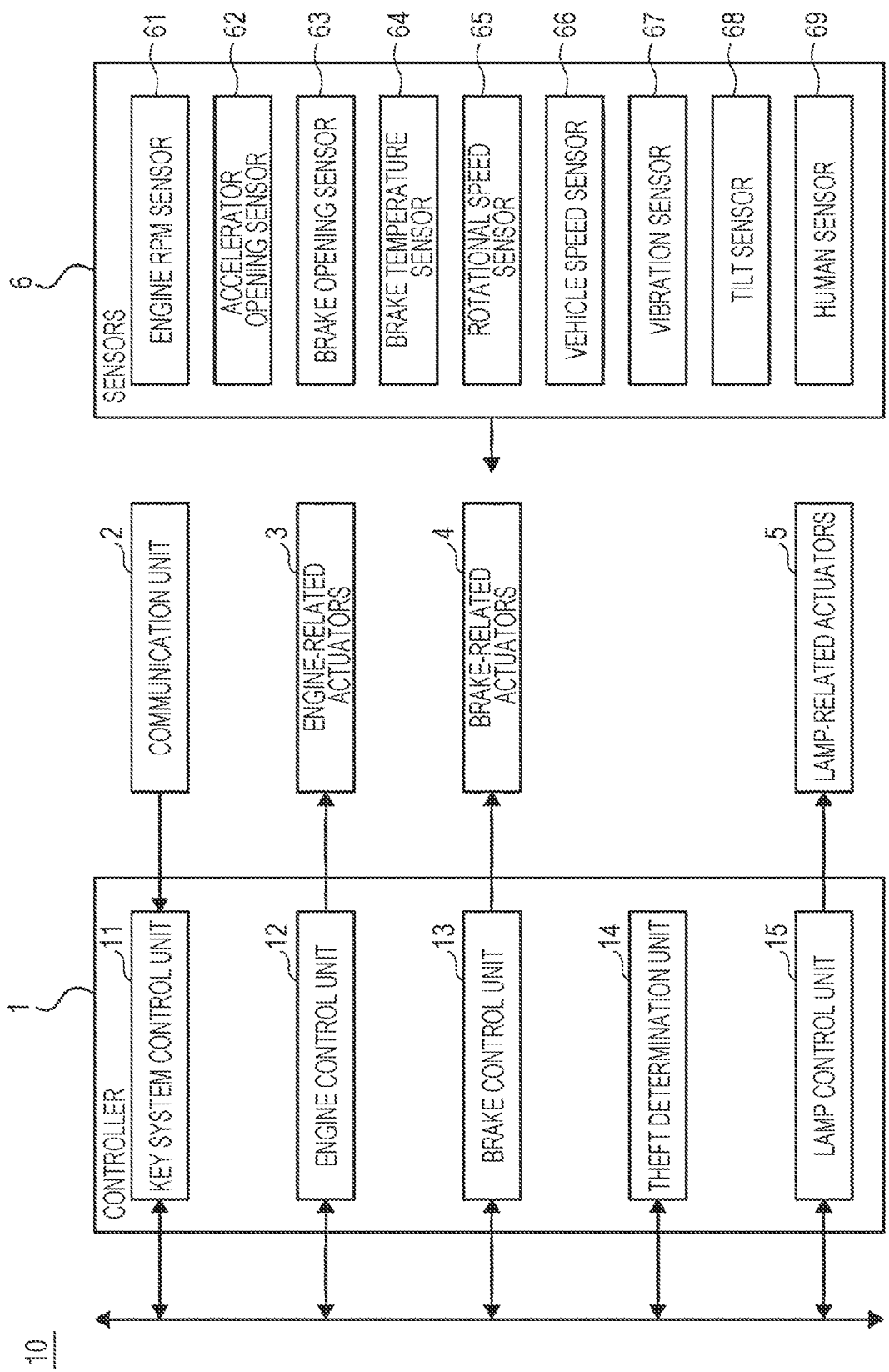
FIG. 2 is an explanatory diagram illustrating an example of the configuration of a vehicle control system.

The vehicle control system 10 includes, as illustrated in FIG. 2, a controller 1, a communication unit 2, engine-related actuators 3, brake-related actuators 4, lamp-related actuators 5, and sensors 6.

Here, the sensors 6 comprehensively indicate various sensors provided in the vehicle 100. The sensors 6 include the following sensors, for example: an engine revolutions per minute (rpm) sensor 61, which detects the rpm of the engine; an accelerator opening sensor 62, which detects the amount of stepping on an accelerator pedal as an accelerator operation amount; a brake opening sensor 63, which detects the amount of stepping on a later-described brake pedal 16 as a brake opening; a brake temperature sensor 64, which detects a temperature used in estimating later-described brake mechanisms 20; a rotational speed sensor 65, which detects the rotational speed of the wheels; a vehicle speed sensor 66, which detects the vehicle speed of the vehicle 100; a vibration sensor 67, which detects the vibrations of the vehicle 100; a tilt sensor 68, which detects the angle of tilt of the vehicle 100; and a human sensor 69, which detects the movement of a person in the cabin by emitting ultrasonic waves or lasers.

The controller 1 includes the following functions: a key system control unit 11, an engine control unit 12, a brake control unit 13, a theft determination unit 14, and a lamp control unit 15.

Figure 3:
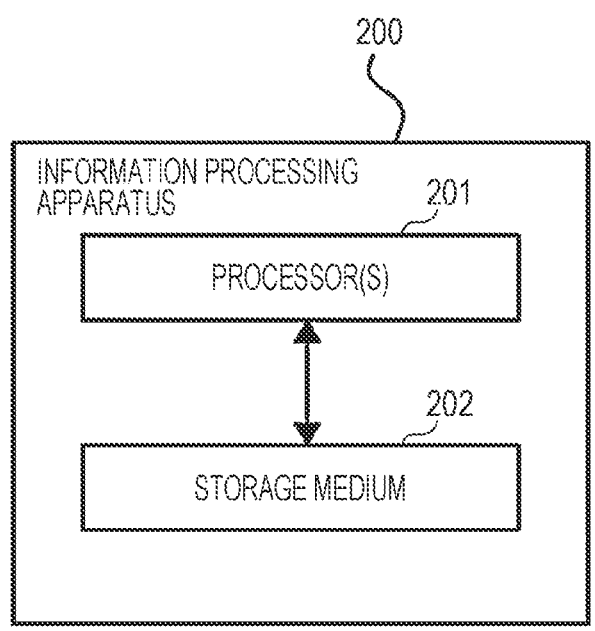
FIG. 3 is an explanatory diagram illustrating an example of the configuration of an information processing apparatus.

As illustrated in FIG. 3, each unit of the controller 1 includes an information processing apparatus 200 including one or more processors 201, such as a central processing unit (CPU), and a storage medium 202, such as a read-only memory (ROM) or a random-access memory (RAM), in which programs executed by the processor(s) 201 are stored. Each program includes one or more instructions that cause the processor(s) 201 to perform various processes. Note that some or all of the functions of each unit can be realized by one or more information processing apparatuses 200.

Referring back to FIG. 2, the key system control unit 11 performs an authentication process as a process of matching identification information that the communication unit 2 has received from a smart key against pre-registered identification information to determine whether the two items of identification information match, and unlocks the door lock in response to the authentication being successful. The key system control unit 11 also supplies an engine start permission signal to the engine control unit 12 when the authentication is successful.

In addition, when the key system control unit 11 detects that the above authentication process has been invalidly performed by rewriting the registered identification information or the like, the key system control unit 11 supplies a fraud detection signal indicating that to the theft determination unit 14.

The engine control unit 12 controls various actuators provided as the engine-related actuators 3 based on detection signals from certain sensors among the sensors 6, operation input information from operators, and the like. As the engine-related actuators 3, various types of actuators related to engine driving, such as a throttle actuator configured to drive a throttle valve and an injector configured to inject fuel, are provided.

For example, the engine control unit 12 applies start/stop control of the engine in response to an operation of an ignition switch or the like. At this time, the engine control unit 12 applies engine start control on the condition that an engine start permission signal is input from the key system control unit 11. Moreover, the engine control unit 12 controls fuel injection timing, fuel injection pulse width, throttle opening, and the like based on detection signals from the engine rpm sensor 61, the accelerator opening sensor 62, and the like.

The engine control unit 12 also refers to different mode maps selected according to the presence or absence of a theft detection signal from the theft determination unit 14 described later. Each mode map indicates the relationship between the accelerator operation amount and the required driving torque. Based on each of the mode maps, the engine control unit 12 sets a required driving torque for determining a torque to be output to the wheels based on the accelerator operation amount. Then, the engine control unit 12 opens/closes the throttle valve by outputting a throttle opening signal and a control signal related to fuel injection, which correspond to the set required driving torque, to the throttle actuator and the injector.

In the case where the vehicle 100 is a hybrid vehicle, the controller 1 includes a hybrid control unit and a motor control unit. The hybrid control unit obtains the required driving torque according to the accelerator operation amount based on the above-described mode maps, and causes the engine control unit 12 and the motor control unit to execute the operation control of the engine and the motor generator for causing the vehicle 100 to drive with a required driving force corresponding to the required driving torque. In the case where the vehicle 100 is an electric vehicle, the controller 1 includes a motor control unit. The motor control unit determines a torque required of the motor generator from the required driving torque obtained based on the accelerator operation amount and the above-described mode maps, and controls the operation of the motor generator based on the required torque.

The brake control unit 13 controls various actuators provided as the brake-related actuators 4 based on detection signals from certain sensors among the sensors 6, operation input information from operators, and the like. As the brake-related actuators 4, various brake-related actuators are provided, such as an actuator configured to control the hydraulic pressure output from a brake booster 41 to a master cylinder 42 illustrated in FIG. 4, and an actuator configured to control the hydraulic pressure in a hydraulic circuit 30. The brake-related actuators 4 will be described in detail later.

The brake control unit 13 also applies, for example, hydraulic pressure control such as antilock braking system (ABS) control operation and electronic stability program (ESP) control operation based on detection signals from the rotational speed sensor 65, the vehicle speed sensor 66, and the like.

Based on detection signals from certain sensors among the sensors 6 and a fraud detection signal from the key system control unit 11, the theft determination unit 14 determines whether the vehicle 100 is in a stolen state.

The theft determination unit 14 makes a theft determination based on various signals, such as detection signals from the vibration sensor 67, the tilt sensor 68, and the human sensor 69, and a fraud detection signal from the key system control unit 11.

At this time, the theft determination unit 14 may make a theft determination based on any of the various signals described above. For example, the theft determination unit 14 may determine that the vehicle 100 is in a stolen state in response to a fraud detection signal being supplied from the key system control unit 11.

Moreover, the theft determination unit 14 may make a theft determination using signals among the various signals described above. For example, the theft determination unit 14 may determine that the vehicle 100 is in a stolen state if both a detection signal in the cabin that is supplied from the human sensor 69 and a detection signal for the vibrations of the vehicle 100 that is supplied by the vibration sensor 67 satisfy certain conditions.

In the case where the theft determination unit 14 determines in the theft determination that the vehicle 100 is in a stolen state, the theft determination unit 14 supplies a theft detection signal indicating that to the engine control unit 12.

The lamp control unit 15 controls turning on/off of brake lamps. The brake lamps are provided on the left and right sides at the rear of the vehicle body, and the lamp control unit 15 controls, for example, turning on of the brake lamps based on a brake operation detection signal from a brake lamp switch 17 provided in the brake pedal 16 illustrated in FIG. 4.

Note that the lamp control unit 15 also controls turning on/off of various lamps including headlamps, clearance lamps, turn signal lamps, and tail lamps, in addition to the brake lamps.

An example of the configuration of the brake-related actuators 4 will be described with reference to FIG. 4.

With regard to the brake-related actuators 4, the brake pedal 16 is linked to a brake booster 41. The brake opening sensor 63 detects the amount of stepping on the brake pedal 16 and supplies a signal indicating the detected amount of stepping-on to the brake control unit 13. In addition, a battery 7 for supplying power is coupled to the brake control unit 13.

The brake booster 41 is, for example, an electric brake booster, and moves the primary piston of a master cylinder 42 under control of the brake control unit 13. For example, the brake booster 41 moves the primary piston by the amount of movement corresponding to the amount of stepping on the brake pedal 16. The brake booster 41 and the brake pedal 16 are mechanically coupled so that brakes can be applied in response to an operation on the brake pedal 16 in the event of an emergency or the like.

Although a brake-by-wire system using an electric brake booster is illustrated as the brake booster 41 here, instead of adopting a brake-by-wire system, for example, a vacuum brake booster linked to the operation of stepping on the brake pedal 16 may be employed.

The master cylinder 42 is a tandem type, is coupled to a reservoir tank 43, and is coupled to the brake mechanisms 20, which brake the wheels according to the brake fluid pressure via the hydraulic circuit 30. The master cylinder 42 generates a brake fluid pressure and applies the brake fluid pressure to the brake mechanisms 20 via the hydraulic circuit 30.

The brake mechanisms 20 are, for example, disc brake units, and are provided in the respective wheels (101, 102, 103, and 104). Each of the brake mechanisms 20 includes a brake caliper 21, a brake piston 22, a brake pad 23, and a brake rotor 24. A brake fluid pressure is applied to the brake caliper 21 via the hydraulic circuit 30. The brake piston 22 is slidably stored in the brake caliper 21 and moves (slides) in the brake caliper 21 due to the brake fluid pressure applied to the brake caliper 21.

The brake pad 23 is coupled to the tip of the brake piston 22, and, when the brake piston 22 is moved by the brake hydraulic pressure, the brake pad 23 is pressed against the brake rotor 24 rotating integrally with the wheel. In doing so, the brake mechanisms 20 brake the vehicle 100 (wheels).

The hydraulic circuit 30 includes two systems, a first hydraulic circuit 30*a* and a second hydraulic circuit 30*b*. The hydraulic circuit 30 is cross piping or front and rear piping, and the first hydraulic circuit 30*a* is coupled to the brake mechanisms 20 provided in the wheels (101 and 102), and the second hydraulic circuit 30*b* is coupled to the brake mechanisms 20 provided in the wheels (103 and 104).

Since the first hydraulic circuit 30*a* and the second hydraulic circuit 30*b* have the same configuration, the following description is simplified by using the same reference numerals. In the hydraulic circuit 30, the master cylinder 42 side is described as upstream and the brake mechanisms 20 side as downstream.

The master cylinder 42 is equipped with a supply/discharge port 42*a* and a supply/discharge port 42*b*. First fluid lines L1 are respectively coupled to the supply/discharge port 42*a* and the supply/discharge port 42*b*. In the first fluid lines L1, the upstream end is coupled to the master cylinder 42, and the downstream end is coupled to second fluid lines L2.

In the second fluid lines L2, the downstream end is branched and coupled to third fluid lines L3 and fourth fluid lines L4. In the third fluid lines L3, the downstream end is coupled to the brake mechanisms 20 (brake calipers 21) of the wheels (101 and 104). In the fourth fluid lines L4, the downstream end is coupled to the brake mechanisms 20 (brake calipers 21) of the wheels (103 and 102). Note that the third fluid lines L3 and the fourth fluid lines L4 may be coupled to the brake mechanisms 20 of any of the wheels. For example, the third fluid line L3 of the first hydraulic circuit 30*a* may be coupled to the brake mechanism 20 of the wheel (101), the fourth fluid line L4 to the brake mechanism 20 of the wheel (104), the third fluid line L3 of the second hydraulic circuit 30*b* to the brake mechanism 20 of the wheel (102), and the fourth fluid line L4 to the brake mechanism 20 of the wheel (104). Alternatively, the third fluid line L3 of the first hydraulic circuit 30*a* may be coupled to the brake mechanism 20 of the wheel (104), the fourth fluid line L4 to the brake mechanism 20 of the wheel (102), the third fluid line L3 of the second hydraulic circuit 30*b* to the brake mechanism 20 of the wheel (101), and the fourth fluid line L4 to the brake mechanism 20 of the wheel (103).

The upstream end of fifth fluid lines L5 is coupled to the middle of the third fluid lines L3. The upstream end of sixth fluid lines L6 is coupled to the middle of the fourth fluid lines L4. Seventh fluid lines L7 are coupled to the downstream end of the fifth fluid lines L5 and the sixth fluid lines L6. The downstream end of the seventh fluid lines L7 is coupled to the downstream side of gate-in valves 31 in the first fluid lines L1 and to the upstream side of hydraulic pumps 32 in the second fluid lines L2.

The first fluid lines L1 are equipped with the gate-in valves 31. The second fluid lines L2 are equipped with the hydraulic pumps 32. Moreover, the hydraulic pumps 32 of the first hydraulic circuit 30*a* and the second hydraulic circuit 30*b* are coupled to a common electric motor 33.

Pulsating decompression mechanisms 34 are provided downstream of the hydraulic pumps 32 in the second fluid lines L2. The pulsating decompression mechanisms 34 attenuate the pulsation of brake fluid discharged from the hydraulic pumps 32.

The upstream side of the gate-in valves 31 in the first fluid lines L1 and the downstream side of the pulsating decompression mechanisms 34 in the second fluid lines L2 are coupled via eighth fluid lines L8. The eighth fluid lines L8 are equipped with bypass valves 35.

The third fluid lines L3 are equipped with pressurization valves 36. The fourth fluid lines L4 are equipped with pressurization valves 37. The fifth liquid lines L5 are equipped with decompression valves 38. The sixth fluid linesIL6 are equipped with decompression valves 39.

The seventh fluid lines L7 are equipped with low-pressure chambers 40. The low-pressure chambers 40 temporarily store the brake fluid.

The gate-in valves 31, the decompression valves 38, and the decompression valves 39 are electromagnetic solenoid valves that close when not energized and that open when energized. The bypass valves 35, the pressurization valves 36, and the pressurization valves 37 are electromagnetic solenoid valves that open when not energized and that close when energized.

The gate-in valves 31, the electric motor 33, the bypass valves 35, the pressurization valves 36, the pressurization valves 37, the decompression valves 38, and the decompression valves 39 are controlled by the brake control unit 13.

In a state where brake fluid pressure control such as ABS control operation or ESP control operation by the brake control unit 13 has not been applied, as described above, the gate-in valves 31, the decompression valves 38, and the decompression valves 39 are closed, and the bypass valves 35, the pressurization valves 36, and the pressurization valves 37 are open. The electric motor 33 is not driven, and the hydraulic pumps 32 are also stopped.

Here, when the driver who drives the vehicle steps on the brake pedal 16, the brake fluid pressure generated in the master cylinder 42 passes through the first fluid lines L1, the eighth fluid lines L8, and the second fluid lines L2, which in turn is branched to the third fluid lines L3 and the fourth fluid lines L4 and supplied to the brake mechanisms 20. Then, with this brake fluid pressure, the brake mechanisms 20 brake the wheels.

By the way, when applying brake fluid pressure control such as ABS control operation or ESP control operation, the brake control unit 13 opens the gate-in valves 31, the pressurization valves 36, and the pressurization valves 37, and closes the bypass valves 35, the decompression valves 38, and the decompression valves 39. The brake control unit 13 also drives the electric motor 33.

In doing so, the hydraulic pumps 32 rotate due to the driving of the electric motor 33, and the brake fluid stored in the reservoir tank 43 is sucked via the master cylinder 42 into the first fluid lines L1 independently of the operation of the brake pedal 16.

The brake fluid sucked into the first fluid lines L1 passes through the second fluid lines L2 via the gate-in valves 31, which in turn is branched to the third fluid lines L3 and the fourth fluid lines L4 and supplied to the brake mechanisms 20. Then, due to the pressurized brake fluid, the brake mechanisms 20 brake the wheels.

The brake control unit 13 applies control to open the gate-in valves 31, the decompression valves 38, and the decompression valves 39, to close the bypass valves 35, the pressurization valves 36, and the pressurization valves 37, and to drive the electric motor 33.

In this case, when the hydraulic pumps 32 rotate due to the driving of the electric motor 33, the brake fluid from wheel cylinders provided in the wheels passes through the third fluid lines L3 (fourth fluid lines L4) and the seventh fluid lines L7 and is stored in the low-pressure chambers 40. This reduces the brake fluid pressure and relieves the braking of the wheels by the brake mechanisms 20.

In the present embodiment, the brake control unit 13 allows the hydraulic pumps 32 to rotate by applying drive control of the electric motor 33, thereby adjusting the pressurization/decompression of the brake fluid pressure; however, the brake control unit 13 may allow the primary piston of the master cylinder 42 to move by controlling the brake booster 41 or the like without applying drive control of the electric motor 33, and adjust the pressurization/decompression of the brake fluid pressure to be produced. In this case, since the hydraulic adjustment using the electric motor 33 is not performed, the gate-in valves 31, the decompression valves 38, and the decompression valves 39 are closed, and the bypass valves 35, the pressurization valves 36, and the pressurization valves 37 are open.

An example of a process executed by the controller 1 according to a first embodiment will be described with reference to FIG. 5. The process illustrated in FIG. 5 is realized mainly through the cooperation of the engine control unit 12, the brake control unit 13, and the theft determination unit 14 in the controller 1.

Firstly in step S101, the theft determination unit 14 repeatedly executes a theft determination with certain timing until it is determined that the vehicle 100 is in a stolen state.

At this time, the theft determination unit 14 makes a determination whether the vehicle 100 is in a stolen state using various signals such as detection signals of the vibration sensor 67, the tilt sensor 68, and the human sensor 69, and a fraud detection signal from the key system control unit 11.

In the case where it is determined in the above theft determination that the vehicle 100 is in a stolen state, the theft determination unit 14 advances the process from step S101 to step S102, and thereafter executes a process in a stolen state. Here, the theft determination unit 14 supplies a theft detection signal to the engine control unit 12 in step S102.

The engine control unit 12, to which the theft detection signal has been supplied, refers to a mode map selected in a stolen state and sets a required driving torque based on the accelerator operation amount in step S103.

The mode map selected here sets a larger value of the required driving torque for the same accelerator operation amount compared with a mode map referenced in a normal state that is not a stolen state. For example, in the case where the normal mode map sets the value of the required driving torque to 10 for an accelerator operation amount of 5%, the mode map selected in a stolen state sets the value of the required driving torque to 20 for an accelerator operation amount of 5%.

By referring to such a mode map in a stolen state, an offset torque signal which gives an offset for increasing the required driving torque per accelerator operation amount compared with the normal mode map is obtained.

Although the engine control unit 12 obtains an offset torque signal by referring to different mode maps according to the stolen state of the vehicle 100 in the present embodiment, the engine control unit 12 may obtain an offset torque signal by, for example, giving an offset for increasing the required driving torque obtained by referring to the normal mode map.

In step S104 thereafter, the engine control unit 12 supplies the obtained offset torque signal to the brake control unit 13.

The brake control unit 13, to which the offset torque signal has been supplied, calculates the amount of brake fluid pressure for compensating for the increase in the required driving torque due to the offset in step S105. The amount of brake fluid pressure calculated here is the value set to prevent the thief who is driving the vehicle 100 from realizing that the vehicle 100 is under control in a stolen state.

Although the term "compensate" is used here, the meaning of the term in the disclosure includes not only the meaning of canceling all of a target, but also the meaning of canceling a part of a target. For example, the phrase "compensating for the increase in the required driving torque due to the offset" here includes not only the meaning of canceling all of the increase, but also the meaning of canceling a part of the increase.

Figure 4:
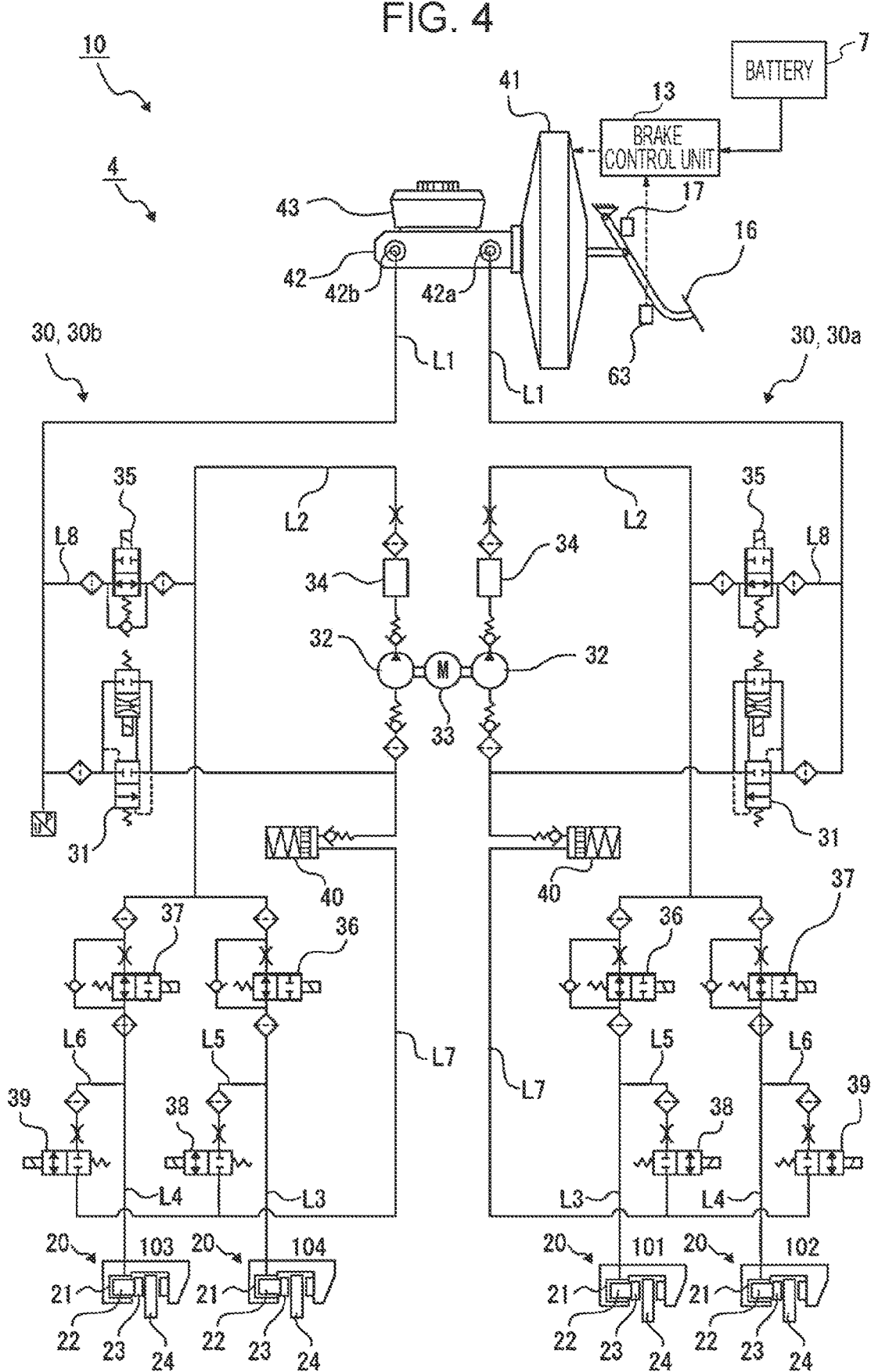
FIG. 4 is an explanatory diagram illustrating an example of the configuration of brake-related actuators.

Then, the brake control unit 13 executes a brake fluid pressure adjustment process, which is applying control to the hydraulic circuit 30 illustrated in FIG. 4 to pressurize the brake fluid based on the calculated amount of fluid pressure. Since the brake fluid is pressurized, the wheels are braked by the brake mechanisms 20.

By continuously braking the wheels while the vehicle 100 is driving, the temperature of the brake mechanisms 20 increases, and the coefficient of friction between the brake pads 23 and the brake rotors 24 gradually decreases, thereby entering a condition that induces a fade phenomenon in which the braking effectiveness is reduced.

By giving in advance an offset to increase the required drive torque in a torque adjustment process of the engine control unit 12 and having the hydraulic circuit 30 pressurize the brake fluid so as to compensate for the increase, the thief can be prevented from realizing that the wheels are being braked by the brake mechanisms 20, thereby making the thief continue to drive the vehicle 100.

In addition, when controlling the electric motor 33 in the brake fluid pressure adjustment process, the brake control unit 13 makes the rotational speed of the electric motor 33 smaller than when the pressurization/decompression of the brake fluid is controlled in processes other than the brake fluid pressure adjustment process. This can reduce the sound generated from the electric motor 33 when the brake fluid pressure adjustment process is performed. This makes it more difficult for the thief to realize, from the driving noise or the like, that control in a stolen state is being applied.

In the brake fluid pressure adjustment process, the brake control unit 13 applies control to pressurize the brake fluid; if the brake pedal 16 is in a non-operation state, no control is applied to turn on the brake lamps. This is to make the thief's companions who are following the stolen vehicle 100 not to realize that a process in a stolen state is being performed.

Note that control to turn on the brake lamps in accordance with the thief's operation on the brake pedal 16 is applied by the lamp control unit 15. Accordingly, by applying the same lighting control as before it is determined that the vehicle 100 is in a stolen state, the thief and the thief's companions will not feel uncomfortable with driving the vehicle 100.

In step S106 thereafter, the brake control unit 13 estimates a temperature detected by the brake temperature sensor 64 as the temperature of the brake mechanisms 20, and determines whether the detected temperature is greater than or equal to a certain threshold.

Here, the certain threshold is set to a value less than a temperature at which a fade phenomenon occurs. For example, a temperature detected by the brake temperature sensor 64 is experimentally determined when a fade phenomenon occurs in the vehicle 100, and, based on that temperature, a certain threshold can be set in advance. At this time, an experiment may be conducted in each season to set a different value for each season as a certain threshold. In addition, a certain threshold may be set according to the materials of the brake pads 23 and/or the brake rotors 24 adopted in the brake mechanisms 20.

The brake control unit 13 repeatedly executes the processing from step S103 to step S107 until it is determined in step S106 that the temperature detected by the brake temperature sensor 64 is greater than or equal to the certain threshold.

In the case where it is determined that the temperature detected in step S106 is greater than or equal to the certain threshold, the brake control unit 13 advances the process from step S107 to step S108.

In step S108, the brake control unit 13 applies control to the hydraulic circuit 30 to further increase the pressure of the brake fluid, that is, pressurization control larger than that in the case of compensating for the offset of the required driving torque.

When the temperature of the brake mechanisms 20 increases, the coefficient of friction between the brake pads 23 and the brake rotors 24 decreases, and it may not be possible to sufficiently compensate for the offset of the required driving torque. Accordingly, the thief may feel uncomfortable with driving, and may eventually realize that control in a stolen state is being applied. Therefore, at this time, the thief's uncomfortable feeling with driving can be lessened by applying greater pressurization control to the hydraulic circuit 30. This makes it more difficult for the thief to realize that, until a fade phenomenon occurs, control in a stolen state is being applied.

After that, the brake control unit 13 continuously executes control to increase the pressure of the brake fluid. Accordingly, a fade phenomenon is induced, and the effectiveness of the brakes is reduced. In addition, the sound, light, smell, and smoke are generated because the brake pads 23 burn out, and this makes it difficult for the thief to drive the vehicle 100. By disabling the vehicle 100 from driving as above, the vehicle 100 can be prevented from being taken away by theft.

Even when the brake pads 23 burn out, the base members of the brake pads 23 can still brake the wheels; thus, even if a process in a stolen state is being performed, the vehicle 100 can be brought to a police station or a maintenance shop by slowly driving, for example. In other words, a condition where the vehicle 100 is completely disabled from driving can be avoided.

Moreover, the state of control based on a process in a stolen state cannot be released except by a certain management apparatus managed by a specific organization, such as a dealer. This can prevent the thief from forcedly releasing this state of control.

In this case, for example, the identification information of the management apparatus is registered in advance in the vehicle 100, and the theft determination unit 14 matches identification information obtained from the management apparatus against the identification information registered in the vehicle 100. If the two items of identification information match, the theft determination unit 14 releases control in a stolen state by supplying a release signal to the engine control unit 12, the brake control unit 13, and the like.

An example of the configuration of the vehicle control system 10 according to a second embodiment will be described with reference to FIGS. 6 and 7. Note that the same reference numeral is given to a portion common to that in the first embodiment, and a description thereof is omitted.

As illustrated in FIG. 6, the brake control unit 13 in the second embodiment includes at least two systems, a first power supply input unit 51 and a second power supply input unit 52. The first power supply input unit 51 is coupled to the battery 7 via a first cable 53 and a first connector 55, and the second power supply input unit 52 is coupled to the battery 7 via a second cable 54 and a second connector 56. Note that the first power supply input unit 51 or the second power supply input unit 52 may be coupled to a power source different from the battery 7.

In the first cable 53, the first connector 55 provided at the tip is attached to the battery 7. In the second cable 54, the second connector 56 provided at the tip is attached to the battery 7. At this time, the second connector 56 is attached to the battery 7 so that the second connector 56 is unremovable from the battery 7 unless the first connector 55 is removed from the battery 7. For example, as illustrated in FIG. 6, in a state where the second connector 56 is attached to the battery 7, the first connector 55 is attached to the battery 7 so as to cover the second connector 56. This ensures that the power supply to the brake control unit 13 using the first cable 53 and the second cable 54 will not be cut off at the same time. Therefore, for example, even when the first cable 53 is removed from the battery 7 by the thief trying to cut off the power supply from the battery 7 to the brake control unit 13 in order to hinder the brake fluid pressurization control by the brake control unit 13, the power supply to the brake control unit 13 can be ensured until the second cable 54 is removed.

Note that the first connector 55 and the second connector 56 only need to be disposed in positional relationship that makes it difficult to remove the first connector 55 and the second connector 56 from the battery 7 at the same time. For example, the first connector 55 and the second connector 56 may be disposed at a distance on a certain one of the faces of the battery 7, or may be disposed on different faces among the faces of the battery 7.

Next, an example of a process executed by the controller 1 according to the second embodiment will be described with reference to FIG. 7. Note that the same reference numeral is given to the same processing as that in the first embodiment, and a description thereof is omitted.

In a state where the theft determination unit 14 determines that the vehicle 100 is in a stolen state in step S101 and a theft detection signal is supplied to the engine control unit 12 in step S102, the brake control unit 13 executes a power supply determination process in step S201.

In the power supply determination process, the brake control unit 13 determines whether the vehicle 100 is in a single-system supply state in which the power supply from one system, the first power supply input unit 51, is cut off, and the power supply from the other system, the second power supply input unit 52, is enabled. The single-system supply state is a state from when the first connector 55 is removed from the battery 7 by the thief to when the second connector 56 is removed.

Note that the brake control unit 13 may determine the state in which the power supply from the second power supply input unit 52 is cut off and the power supply from the first power supply input unit 51 is enabled as the single-system supply state. As this single-system supply state, for example, the state in which the second cable 54 is disconnected first is assumed.

In the case where it is determined in the power supply determination process that the vehicle 100 is in the single-system supply state, the brake control unit 13 advances the process from step S201 to step S202, and executes control to increase the brake fluid pressure. Pressurization of the brake fluid here may be pressurization that promotes the occurrence of a fade phenomenon. The brake control unit 13 applies, to the hydraulic circuit 30, for example, control to apply pressure more than that in the case of compensating for the offset of the required driving torque.

In step S203, the brake control unit 13 applies control to a maintenance mechanism to maintain the brake fluid pressure that has been increased by the pressurization control in step S202. The maintenance mechanism is equipped with, for example, knock pins that fix the positions of the bypass valves 35, the pressurization valves 36, and the pressurization valves 37, and actuators that drive the knock pins. By pushing in the knock pins using the actuators, the above-mentioned valves can be fixed to a closed state. Accordingly, even in the case where the power supply from the battery 7 to the brake control unit 13 is cut off, and the brake control unit 13 stops functioning, the pressurized state can be maintained due to the increased brake fluid pressure.

Therefore, even when the thief removes the remaining second connector 56 from the battery 7 to cut off the power supply to the brake control unit 13, the wheels remain braked by the brake mechanisms 20, thereby causing a fade phenomenon to occur. This disables the vehicle 100 from driving, thereby preventing the thief from taking away the vehicle 100.

Note that, in the case where it is determined in step S201 that the vehicle 100 is not in the single-system supply state, the brake control unit 13 advances the process to step S103 and, until it is determined in step S107 that the temperature of the brake mechanisms 20 is greater than or equal to the certain threshold or it is determined in step S201 that the vehicle 100 is in the single-system supply state, repeats the processing in step S201 and from step S103 to step S107. Accordingly, an offset is given to increase the required driving torque which is determined based on the accelerator operation amount, and control is executed to pressurize the brake fluid so as to compensate for a part or all of the increase in the required driving torque due to the offset.

In the case where it is determined in step S107 that the temperature of the brake mechanisms 20 is greater than or equal to the certain threshold, the brake control unit 13 advances the process to step S108, and applies pressurization control to the hydraulic circuit 30 to apply pressure more than that in the case of compensating for the offset of the required driving torque. This induces a fade phenomenon in the vehicle 100.

As described above, the vehicle 100 includes the brake mechanisms 20, which brake the wheels according to the brake fluid pressure, the hydraulic circuit 30, which adjusts the brake fluid pressure and transfers it to the brake mechanisms 20, and the controller 1 (see FIGS. 2 and 4). The controller 1 includes the functions of, for example, the engine control unit 12, the brake control unit 13, and the theft determination unit 14.

Here, if the theft determination unit 14 determines that the vehicle 100 is in a stolen state, the engine control unit 12 executes a torque adjustment process of giving an offset to increase the required driving torque which is determined based on the accelerator operation amount (see steps S103 and S104 in FIG. 5). In addition, the brake control unit 13 executes a brake fluid pressure adjustment process of applying control to the hydraulic circuit 30 to pressurize the brake fluid so as to compensate for the increase in the required driving torque due to the offset (see step S105 in FIG. 5).

Accordingly, even in a state where the wheels are braked by the brake mechanisms 20 in the brake fluid pressure adjustment process, the driving speed of the vehicle 100 according to the accelerator operation amount is maintained substantially as before the determination of a stolen state. This makes it more difficult for the thief to realize that the brake fluid has been internally pressurized and the brake mechanisms 20 are sliding against the wheels. Thus, a fade phenomenon can be induced without being noticed by the thief, thereby disabling the vehicle 100 from driving. Accordingly, the vehicle 100 can be effectively prevented from being stolen.

Since the brake mechanisms 20 are easily replaceable and the cost of replacement is inexpensive, the vehicle 100 can be easily repaired after being disabled from driving.

The above-described vehicle 100 includes the brake temperature sensor 64, which detects the temperature of the brake mechanisms 20; and, after starting control to pressurize the brake fluid for compensation in the brake fluid pressure adjustment process, if the temperature detected by the brake temperature sensor 64 is greater than or equal to the certain threshold, the brake control unit 13 applies control to the hydraulic circuit 30 to further increase the pressure of the brake fluid (see S107 and S108 in FIG. 5).

Accordingly, even in a state where the coefficient of friction between the brake pads 23 and the brake rotors 24 decreases, the brake mechanisms 20 can reliably brake the wheels. This makes it difficult for the thief to realize that, until a fade phenomenon occurs, control in a stolen state is being applied.

In the above-described vehicle 100, when the brake control unit 13 applies control to pressurize the brake fluid in the brake fluid pressure adjustment process, the rotating speed of the electric motor 33 is made smaller than that in the case of applying control to pressurize the brake fluid in processes other than the brake fluid pressure adjustment process (see step S105 in FIG. 5).

This can reduce the sound generated from the electric motor 33 in the brake fluid pressure adjustment process. Accordingly, the thief can be prevented from realizing, from the driving noise or the like, that control in a stolen state is being applied.

In the above-described vehicle 100, even if control to pressurize the brake fluid is applied in a brake non-operation state, no control is applied to turn on the brake lamps (see FIG. 2 and step S105 in FIG. 7).

Accordingly, control to turn on the brake lamps is not applied except for the thief's operation on the brake pedal 16. Accordingly, the thief's companions who are following the stolen vehicle 100 can be prevented from realizing that a process in a stolen state is being performed.

In the above-described vehicle 100, the hydraulic circuit 30 includes the brake fluid pressure maintenance mechanism, and the brake control unit 13 includes at least two systems, the first power supply input unit 51 and the second power supply input unit 52 (see FIG. 6).

At this time, in the case where the power supply from one system, the first power supply input unit 51, is cut off and the power supply from the other system, the second power supply input unit 52, is enabled, the brake control unit 13 applies control to the hydraulic circuit 30 to increase the brake fluid pressure, and applies control to the maintenance mechanism to maintain the brake fluid pressure that has been increased by the pressurization (see steps S201 to S203 in FIG. 7).

Accordingly, before the power supply from the remaining second power supply input unit 52 is cut off, the state of the brake mechanisms 20 of the braked wheels can be fixed. Therefore, even in the state where the thief perceives the cutting off of the power supply to the brake control unit 13 and the power supply to the brake control unit 13 is completely cut off, it is possible to maintain a state in which a fade phenomenon can be induced. Thus, the vehicle 100 can be disabled from driving while avoiding the thief's manipulation.

Finally, the effects described in the disclosure are illustrative and not limited, and other effects or some of the effects described in the disclosure may be achieved. Not all of the combinations of configurations described in the embodiments may be necessarily required in solving the problem.

The controller 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 1 including the key system control unit 11, the engine control unit 12, the brake control unit 13, the theft determination unit 14, and the lamp control unit 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
a brake mechanism configured to brake a wheel in accordance with a pressure of a brake fluid;
a hydraulic circuit configured to adjust the pressure of the brake fluid and transfer the brake fluid to the brake mechanism; and
a controller, wherein:
the controller includes one or more processors, and a storage medium in which one or more programs executed by the one or more processors are stored,
the one or more programs include one or more instructions,
the one or more instructions cause the one or more processors to execute:
a torque adjustment process of giving an offset to increase a required driving torque determined based on an operation amount of accelerator of the vehicle in a case where it is determined that the vehicle is in a stolen state; and
a brake fluid pressure adjustment process of applying, to the hydraulic circuit, control to pressurize the brake fluid so as to compensate for an increase in the required driving torque due to the offset.

2. The vehicle according to claim 1, further comprising a brake temperature sensor configured to detect a temperature of the brake mechanism,
wherein, in the brake fluid pressure adjustment process, in a case where the temperature detected by the brake temperature sensor is greater than or equal to a certain threshold after the control to pressurize the brake fluid for compensation is started, control is applied to the hydraulic circuit to further increase the pressure of the pressurized brake fluid.

3. The vehicle according to claim 1, further comprising a motor as a drive source configured to pressurize the brake fluid in the hydraulic circuit,
wherein, a rotating speed of the motor when applying the control to pressurize the brake fluid in the brake fluid pressure adjustment process is smaller than a rotating speed of the motor when applying control to pressurize the brake fluid in a process other than the brake fluid pressure adjustment process.

4. The vehicle according to claim 2, further comprising a motor as a drive source configured to pressurize the brake fluid in the hydraulic circuit,
wherein, a rotating speed of the motor when applying the control to pressurize the brake fluid in the brake fluid pressure adjustment process is smaller than a rotating speed of the motor when applying control to pressurize the brake fluid in a process other than the brake fluid pressure adjustment process.

5. The vehicle according to claim 1, wherein
even when the control to pressurize the brake fluid is applied in a brake non-operation state, no control is applied to turn on brake lamps.

6. The vehicle according to claim 2, wherein
even when the control to pressurize the brake fluid is applied in a brake non-operation state, no control is applied to turn on brake lamps.

7. The vehicle according to claim 3, wherein
even when the control to pressurize the brake fluid is applied in a brake non-operation state, no control is applied to turn on brake lamps.

8. The vehicle according to claim 4, wherein
even when the control to pressurize the brake fluid is applied in a brake non-operation state, no control is applied to turn on brake lamps.

9. The vehicle according to claim 1, wherein
the hydraulic circuit includes a maintenance mechanism for the pressure of the brake fluid,
the controller includes a brake control unit that is a computer unit configured to control the hydraulic circuit,
the brake control unit includes at least two systems of power supply input units, and
the brake control unit is configured such that, in a case where power supply from one system of the power supply input unit is cut off and power supply from the other system of the power supply input unit is enabled, the brake control unit applies control to the hydraulic circuit to increase a brake fluid pressure of the brake fluid, and applies control to the maintenance mechanism to maintain the brake fluid pressure increased by pressurization.

10. The vehicle according to claim 2, wherein
the hydraulic circuit includes a maintenance mechanism for the pressure of the brake fluid,
the controller includes a brake control unit that is a computer unit configured to control the hydraulic circuit,
the brake control unit includes at least two systems of power supply input units, and
the brake control unit is configured such that, in a case where power supply from one system of the power supply input unit is cut off and power supply from the other system of the power supply input unit is enabled, the brake control unit applies control to the hydraulic circuit to increase a brake fluid pressure of the brake fluid, and applies control to the maintenance mechanism to maintain the brake fluid pressure increased by pressurization.

11. The vehicle according to claim 3, wherein
the hydraulic circuit includes a maintenance mechanism for the pressure of the brake fluid,
the controller includes a brake control unit that is a computer unit configured to control the hydraulic circuit,
the brake control unit includes at least two systems of power supply input units, and
the brake control unit is configured such that, in a case where power supply from one system of the power supply input unit is cut off and power supply from the other system of the power supply input unit is enabled, the brake control unit applies control to the hydraulic circuit to increase a brake fluid pressure of the brake fluid, and applies control to the maintenance mechanism to maintain the brake fluid pressure increased by pressurization.

12. The vehicle according to claim 4, wherein
the hydraulic circuit includes a maintenance mechanism for the pressure of the brake fluid,
the controller includes a brake control unit that is a computer unit configured to control the hydraulic circuit,
the brake control unit includes at least two systems of power supply input units, and
the brake control unit is configured such that, in a case where power supply from one system of the power supply input unit is cut off and power supply from the other system of the power supply input unit is enabled, the brake control unit applies control to the hydraulic circuit to increase a brake fluid pressure of the brake fluid, and applies control to the maintenance mechanism to maintain the brake fluid pressure increased by pressurization.

13. The vehicle according to claim 5, wherein
the hydraulic circuit includes a maintenance mechanism for the pressure of the brake fluid,
the controller includes a brake control unit that is a computer unit configured to control the hydraulic circuit,
the brake control unit includes at least two systems of power supply input units, and
the brake control unit is configured such that, in a case where power supply from one system of the power supply input unit is cut off and power supply from the other system of the power supply input unit is enabled, the brake control unit applies control to the hydraulic circuit to increase a brake fluid pressure of the brake fluid, and applies control to the maintenance mechanism to maintain the brake fluid pressure increased by pressurization.

14. The vehicle according to claim 6, wherein
the hydraulic circuit includes a maintenance mechanism for the pressure of the brake fluid,
the controller includes a brake control unit that is a computer unit configured to control the hydraulic circuit,
the brake control unit includes at least two systems of power supply input units, and
the brake control unit is configured such that, in a case where power supply from one system of the power supply input unit is cut off and power supply from the other system of the power supply input unit is enabled, the brake control unit applies control to the hydraulic circuit to increase a brake fluid pressure of the brake fluid, and applies control to the maintenance mechanism to maintain the brake fluid pressure increased by pressurization.

15. The vehicle according to claim 7, wherein
the hydraulic circuit includes a maintenance mechanism for the pressure of the brake fluid,
the controller includes a brake control unit that is a computer unit configured to control the hydraulic circuit,
the brake control unit includes at least two systems of power supply input units, and
the brake control unit is configured such that, in a case where power supply from one system of the power supply input unit is cut off and power supply from the other system of the power supply input unit is enabled, the brake control unit applies control to the hydraulic circuit to increase a brake fluid pressure of the brake fluid, and applies control to the maintenance mechanism to maintain the brake fluid pressure increased by pressurization.

16. The vehicle according to claim 8, wherein the hydraulic circuit includes a maintenance mechanism for the pressure of the brake fluid, the controller includes a brake control unit that is a computer unit configured to control the hydraulic circuit, the brake control unit includes at least two systems of power supply input units, and the brake control unit is configured such that, in a case where power supply from one system of the power supply input unit is cut off and power supply from the other system of the power supply input unit is enabled, the brake control unit applies control to the hydraulic circuit to increase a brake fluid pressure of the brake fluid, and applies control to the maintenance mechanism to maintain the brake fluid pressure increased by pressurization.

* * * * *